(12) United States Patent
Tsujino et al.

(10) Patent No.: US 6,185,337 B1
(45) Date of Patent: *Feb. 6, 2001

(54) SYSTEM AND METHOD FOR IMAGE RECOGNITION

(75) Inventors: Hiroshi Tsujino; Edgar Koerner; Tomohiko Masutani, all of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/989,416

(22) Filed: Dec. 12, 1997

(30) Foreign Application Priority Data

Dec. 17, 1996 (JP) .................................................. 8-336689

(51) Int. Cl.[7] ...................................................... G06K 9/70
(52) U.S. Cl. .......................................... 382/227; 382/206
(58) Field of Search ............................... 382/118, 206, 382/224, 226, 227, 160

(56) References Cited

U.S. PATENT DOCUMENTS

| 5,058,184 | * | 10/1991 | Fukushima | 382/37 |
| 5,164,992 | | 11/1992 | Turk et al. | 382/2 |
| 5,331,544 | * | 7/1994 | Lu et al. | 364/401 |
| 5,337,372 | * | 8/1994 | LeCun et al. | 382/27 |
| 5,432,864 | * | 7/1995 | Lu et al. | 382/118 |
| 5,497,430 | * | 3/1996 | Sadovnik et al. | 382/156 |

(List continued on next page.)

FOREIGN PATENT DOCUMENTS 0 733 989   9/1993   (EP) .

OTHER PUBLICATIONS

Pentland et al., "View–based and modular eignespaces for face recognition", Proceedings CVPR '94, Jun. 23, 1994.*

(List continued on next page.)

Primary Examiner—Amelia Au
Assistant Examiner—Martin Miller
(74) Attorney, Agent, or Firm—Paul A. Guss

(57) ABSTRACT

In an artificial intelligence system for image recognition, a global image of an object is input from a camera or other optical pick-up device, and is processed in a global image processing means, which performs analytical processing on the global image by extracting global characteristics of the input image and evaluating consistency of the extracted global characteristics. Simultaneously, the image data is processed in a local image processing means which undertakes analytical processing on a plurality of local images defining local portions of the image to be recognized. The local image processing means is constructed by plural modules, each further defined by sub-modules, which conduct respective analyses corresponding to local images having characteristics useful in recognizing the global image, wherein each local processor extracts characteristics of an input local image and evaluates consistency of the extracted characteristic with the object to be recognized. Importantly, the global image processing means receives inputs from the local modules, and deactivates functions of local modules which are inconsistent with the global characteristics, while activating and promoting functions of local modules which are consistent with the global characteristics. Through top-down control from the global image processor, as well as inter-module signals between respective local processing modules, since inconsistent processes are quickly discovered,

13 Claims, 5 Drawing Sheets

U.S. PATENT DOCUMENTS

| | | | |
|---|---|---|---|
| 5,550,928 | * | 8/1996 | Lu et al. .............................. 382/116 |
| 5,566,273 | | 10/1996 | Huang et al. .......................... 395/23 |
| 5,629,752 | * | 5/1997 | Kinjo .................................... 355/35 |
| 5,675,663 | | 10/1997 | Koerner et al. ...................... 382/181 |
| 5,710,833 | * | 1/1998 | Moghaddam et al. ............... 382/228 |
| 5,719,951 | * | 2/1998 | Shakleton et al. ................... 382/118 |
| 5,901,244 | * | 5/1999 | Souma et al. ........................ 382/190 |

OTHER PUBLICATIONS

Turk et al., "Face recognition using eigenfaces", Proceedings CVPR '91, Jun. 6, 1991.*

Koerner et al., "A Cortical–type Modular Neural Network for Hypothetical Reasoning," Neural Networks, vol. 10, No. 5, pp. 791–814, 1997.

Olshausen, B.A. et al., "A Neurobiological Model of Visual Attention and Invariant Pattern Recognition based on Dynamic Routing of Information," Journal of Neuroscience, 13(11), Nov. 11, 1993, pp. 4700–4719.

Baron, R.J., "Mechanisms of Human Facial Recognition," International Journal of Man–Machine Studies, vol. 15, No. 2, Aug. 1981, pp. 137–178.

* cited by examiner-

FIG. 5 a) without top-down feedback

| target | | time step | | | | | | | | |
|---|---|---|---|---|---|---|---|---|---|---|
| | | 1 | 2 | 3 | 4 | 5 | 6 | 7 | 8 | 9 |
| State of top-down feedback from AIT to PIT | | | | | | | | | | |
| State of local evaluation on hypotheses at PIT (R2 activation) | | | | | | | | | | |
| State of hypotheses at PIT (R0 activation) | right eye | | | | | | | | | |
| | left eye | | | | | | | | | |
| | nose | | | | | | | | | |
| | mouth | | | | | | | | | | b) with top-down feedback

| target | | time step | | | | |
|---|---|---|---|---|---|---|
| | | 1 | 2 | 3 | 4 | 5 |
| State of top-down feedback from AIT to PIT | | | | | | |
| State of local evaluation on hypotheses at PIT (R2 activation) | | | | | | |
| State of hypotheses at PIT (R0 activation) | right eye | | | | | |
| | left eye | | | | | | 
| | nose | | | | | |
| | mouth | | | | | |

SYSTEM AND METHOD FOR IMAGE RECOGNITION

BACKGROUND OF THE INVENTION

1. Field of the Invention

The present invention relates to artificial intelligence systems for image recognition. More specifically, the present invention is an image information processing system in which, based on a hypothesis regarding the basic scheme of visual information processing which approximates an actual biological vision system, various image information input through a camera or similar optical device is quantified, and subjected to calculational processing in a computer for enabling recognition of objects in the image. The system further employs automatic self-learning of object models for efficiently recognizing images.

2. Description of the Related Art

As the physiological functions of biological image recognition become further elucidated in the prior art, models have been constructed using computers and the like for approximating such recognition functions, and efforts have come about to construct artificial intelligence based visual learning systems. In such visual learning systems, a visual scene which is input via a video camera, for example, is expressed as a numerical value, and based on analysis thereof, an image object from within the visual scene is recognized, specified and/or classified. More specifically, in such systems, analytical processing is undertaken for recognizing correspondence between an input image pattern and an image pattern of a recognized object accumulated through learning.

The input scene is converted into a numerical value, such as a voltage value, which corresponds to the intensity of pixels making up the image, and expressed as a vector. For example, in the case of an image size occupying a 27×27 pixel region, a 729 dimensional vector is expressed in the form of a variance (dispersion) in an orthogonal axial space. As such, analytical processing of such a large amount of data, and distinguishing a target image pattern therefrom, is nearly impossible even with the capabilities of present computers.

Accordingly, to facilitate this analysis, there exists a demand for processing to be performed for converting the input image pattern which is the object of recognition into compressed data expressing the characteristics thereof, whereby comparison with accumulated learned patterns can then be relatively easily undertaken.

For efficiently analyzing the data, it is desirable to compartmentalize the data space into a so-called subspace, so as to limit the data space to its most characteristic regions.

A known method for satisfying this demand is principal component analysis (PCA). According to this method, the distribution of the object image data of a multidimensional image space is converted into feature space, and the principal components of eigenvectors which serve to characterize such space are used. More specifically, the eigenvectors are caused respectively by the amount of change in pixel intensity corresponding to changes within the image group, and can thus be thought of as characteristic axes for explaining the image.

The respective vectors corresponding to the object image include those which contribute greatly to the eigenvectors as well as those which do not contribute so much. The object image is caused by a large change of the image group, and can be closely expressed, for example, based on the collection of principal components of eigenvectors having large eigenvalues.

Stated in different terms, in order to very accurately reproduce a target image, a large number of eigenvectors are required. However, if one only desires to express the characteristics of the outward appearance of an object image, it can be sufficiently expressed using a smaller number of eigenvectors. A system utilizing the above-described eigenspace method, for recognizing human faces, is disclosed by U.S. Pat. No. 5,164,992, the disclosure of which is explicitly incorporated into the present specification by reference. This technology shall now be summarized below.

First, the facial images of a plurality of previously known persons are learned. Letting N be the number of pixels making up the facial image, M facial images are then expressed by respective vectors $\Gamma_1, \Gamma_2, \Gamma_3 \ldots \Gamma_n$ each of length $N^2$.

Taking the difference between the vector of each person's face and the average value ($\Phi_i = \Gamma_i$-average vector), this results in M vector groups. If a vector group A is defined by $A = (\Phi_i \ldots \Phi_M)$, by calculating a vector $\upsilon_k$ and a scalar quantity $\lambda_k$ as eigenvectors and eigenvalues, respectively, of the covariant matrix $C = AA^T$ of A, an eigenspace of the face is determined.

In the case of an image made up of N×N pixels, the matrix C has $N^2$ eigenvectors and eigenvalues. However, when the facial data amount M is less than the $N^2$ dimensions of the overall image space (i.e. $M<<N^2$), which includes not only facial data but background data as well, in order to recognize the facial image it is acceptable to calculate only the eigenvectors of an M×M dimensional matrix $A^T A$. The vector space $u_i = A\upsilon_i$ can be determined from the M eigenvectors $\upsilon_i$ of the matrix L.

Hence, the data according to the above analysis is compressed whereby the number of required calculations is reduced considerably.

The input facial image is converted into the components of facial space (i.e. projected into an eigenspace of the face) through a simple operation, as follows, $$\omega_k = u_k^T (\Gamma - \Psi)$$

$\Psi$: Average Vector which is conducted in an image processing apparatus.

Secondly, a vector $\Omega^T = (\omega_1, \omega_2 \ldots \omega_M)$ expresses as a weighting the degree at which each facial eigenspace contributes to the input image pattern. The vector $\Omega$ is utilized as a standard pattern recognition.

The Euclidean distance $\xi$ between the input image $\Phi = \Gamma - \Psi$ and the facial eigenspace $\Phi_f$ defined by equation (1) is determined from equation (2), both equations being shown below. If $\xi$ is within a given threshold value, the input image is recognized as belonging to $\Phi_f$.

$$\Phi_f = \sum_{i=1}^{M} \omega_i u_i \tag{1}$$

$$\varepsilon^2 = \|\Phi - \Phi_f\|^2 \tag{2}$$

Stated otherwise, from within an overall image scene, by determining a vector which best evaluates the distribution of the facial images therein, the data can be limited to the partial space of the facial image. Accordingly, the amount of data is considerably reduced, and one is able to focus on a single set of data which is limited to that making up the facial characteristics.

Once the evaluation vector has been determined, the input images can be classified as having faces therein or not, and if it is judged that a face is present, a particular individual's face can be recognized by comparison with the accumulated data of facial patterns from previously known individuals. Turk et al., the inventors in the above-identified U.S. Pat. No. , performed principal component analysis on learned images of 128 facial images, and in a facial recognition test undertaken in actual practice using 20 essential eigenvectors, the inventors were able to achieve a 95% rate of recognition with respect to 200 facial images.

The eigenspace method of image recognition is more effective than standard recognition techniques using template matching or standardized correlation relationships. However, in the case of images expressed by high multidimensional vectors, the parts of image features which are not explained well must be surmised, and if there are no inferential techniques for omitting the image processing calculations, it then becomes necessary to perform expanded calculations concerning all vectors, which is impossible in actual practice.

Additionally, the structural descriptions of knowledge concerning image information using only the eigenspace method are complex, and it is problematic when adapted to understanding of images in general. When applied to recognition of images which exist in reality, methods have to be established for correcting the mistaken processing results which invariably occur. Accordingly, new systems logic is indispensable for expanding the applicability of the eigenspace method to various kinds of image recognition.

SUMMARY OF THE INVENTION

The present invention has the object of providing an image recognition system which is suitable for performing recognition of object images, including a global image processor for performing image information processing of a global image of an object of recognition which is input via an optical means, and a local image processor for performing image information processing of a local image, which is a partial image expressing the characteristics of the global image, wherein each of the aforementioned image processors has functions for extracting characteristics of the input image and for evaluating the consistency (matching) of the image. Based on the evaluation of such consistency, the processing functions of other image information processing devices are activated or deactivated, whereby recognition of the object image is performed by developing and discerning authentic image recognition from out of non-authentic image recognition.

A further object is to provide a system capable of reducing the computational burden on a computer, as well as enabling image recognition in a shorter time than capable with presently known image recognition system, by employing a model of the visual information processing mechanisms of the cerebral cortex of biological beings, as described in "A processing control scheme derived from a bottom up flow of image information in which final recognized images are arrived at from recognition of simple forms, and a top down flow of image information in which, conversely, simple initial form recognition is reached from final recognized images." (Koerner, Tsujino, Masutani, "A Cortical-Type Modular Network for Hypothetical Reasoning," *Neural Network*, vol. 10, no. 5, pp. 791–814, 1997.) The disclosure of this document is expressly incorporated by reference into the present specification.

A still further object of the present invention is to provide an image recognition system employing a system in which a global image, which is the object of recognition, and a characteristic local image making up a portion of the object are subjected to parallel image processing, and automatically compared while deactivating inconsistent assumptions, and activating assumptions which are consistent, wherein by means of self-learning, the degree of certainty in recognizing images is improved.

In order to achieve the above-stated objects, the image recognition system of the present invention provides a system for performing image recognition of an object from a global image of the object and characteristic local images, and is constructed by a global image processor for conducting analytical processing on the global image, and a local image processor for conducting analytical processing on the local images. Each of the image processors has functions for extracting characteristics of an input image, as well as evaluating consistency between the extracted characteristics and the image which is to be recognized. The global image processor is characterized by receiving an input from the local image processor, wherein the functions of the local image processor which are inconsistent with the global characteristics are deactivated, and the functions of the local image processor which are consistent with the global characteristics are activated.

The image recognition system of the present invention if further characterized by a local image processor made up of a local module comprising three sub-modules, wherein the first sub-module has a function for extracting characteristics of the local image, the second sub-module contains knowledge of the eigenspace of the local image, and the third sub-module has a function for evaluating consistency.

The local module of the local image processor is further characterized wherein each characteristic locality corresponds to and is arranged with an input topology.

The local image processor further comprises plural local modules in which the characteristic localities thereof are the same, wherein the functions of each local module are mutually activated and controlled by a control signal based on evaluations performed in each local module.

The local image processor further comprises a plurality of local modules having differing characteristic localities, wherein the functions of each local module are mutually activated and controlled by a control signal based on evaluations performed in each local module.

The image recognition system of the present invention is further characterized by a global image processor which is made up of a module comprising three sub-modules, wherein the first sub-module has a function for extracting characteristics of the global object image, the second sub-module contains knowledge of the eigenspace, and the third sub-module has a function for evaluating consistency.

The image recognition system of the present invention is further characterized wherein the global image processor receives an input from the local image processor, and based thereon the functions of local modules which are inconsistent with the global characteristics are deactivated, and further comprising means for outputting control signals for activating the functions of the local image processor which are consistent with the global characteristics.

The image recognition system of the present invention is one in which recognition of an object is performed based on recognition of a global image of the object, together with recognition of characteristic local images making up part of the global image. Accordingly, in this system, accurate image recognition can be performed, and plural local modules have the capability of performing sequence-seeking operations in parallel. Also, based on consistency with global characteristics in the global image processor, and deactivation signals based on the evaluations of the local image processor, functions of the local image processor which are determined to be inconsistent are quickly deactivated, so that the time required for reaching final image recognition can be shortened, and the burden on the computer can be reduced.

Further, in the image processing system of the present invention, simultaneously with initiating analysis of local image processing in the local image processor, the global image processor likewise receives an input global image and undertakes analytical processing thereof. As the analytical processing in the global image processor progresses swiftly, it becomes possible to control the functions of each sub-module of the local image processor. Further, based on the evaluation result, in order to further increase the degree of accuracy of recognition, each sub-module of the local module is activated, and can be confirmed from the evaluation result.

The feature extraction function of the local module making up the local image processor in the present invention can be based on an average vector of learned local images of the object and/or principal component analysis (PCA). For initial analytical processing, features can be extracted in the form of simple shapes, outlines or blobs.

The functions for data processing of images in the present invention are shared between three sub-modules, and the apparatus is structured such that the functions are deactivated or activated at the level of each sub-module. Thus, unnecessary calculations are suppressed in a short time period, enabling a sequential-seeking image recognition method to be effected.

Further, the functions of each of the sub-modules effect computational processing based on the eigenspace method, thus providing the capability for calculations from compressed data and lessening computational burden on the computer.

In the present invention, local modules which together correspond to locations having similar forms or in which the input topology thereof are close to each other, are grouped together as neighboring local modules. Further, with respect to an input local image, only those local modules of a given local module group are simultaneously operated, thereby enabling rapid image recognition while lessening computational load.

The above and other objects, features, and advantages of the visual recognition system of the present invention will become apparent from the following description when taken in conjunction with the accompanying drawings which illustrate preferred embodiments of the present invention by way of example.

BRIEF DESCRIPTION OF THE DRAWINGS

FIG. 5 and FIG. 6 are both views for showing a simulation result of the present invention, performed using a human face as an object for image recognition.

DETAILED DESCRIPTION OF THE PREFERRED EMBODIMENTS

Figure 1:
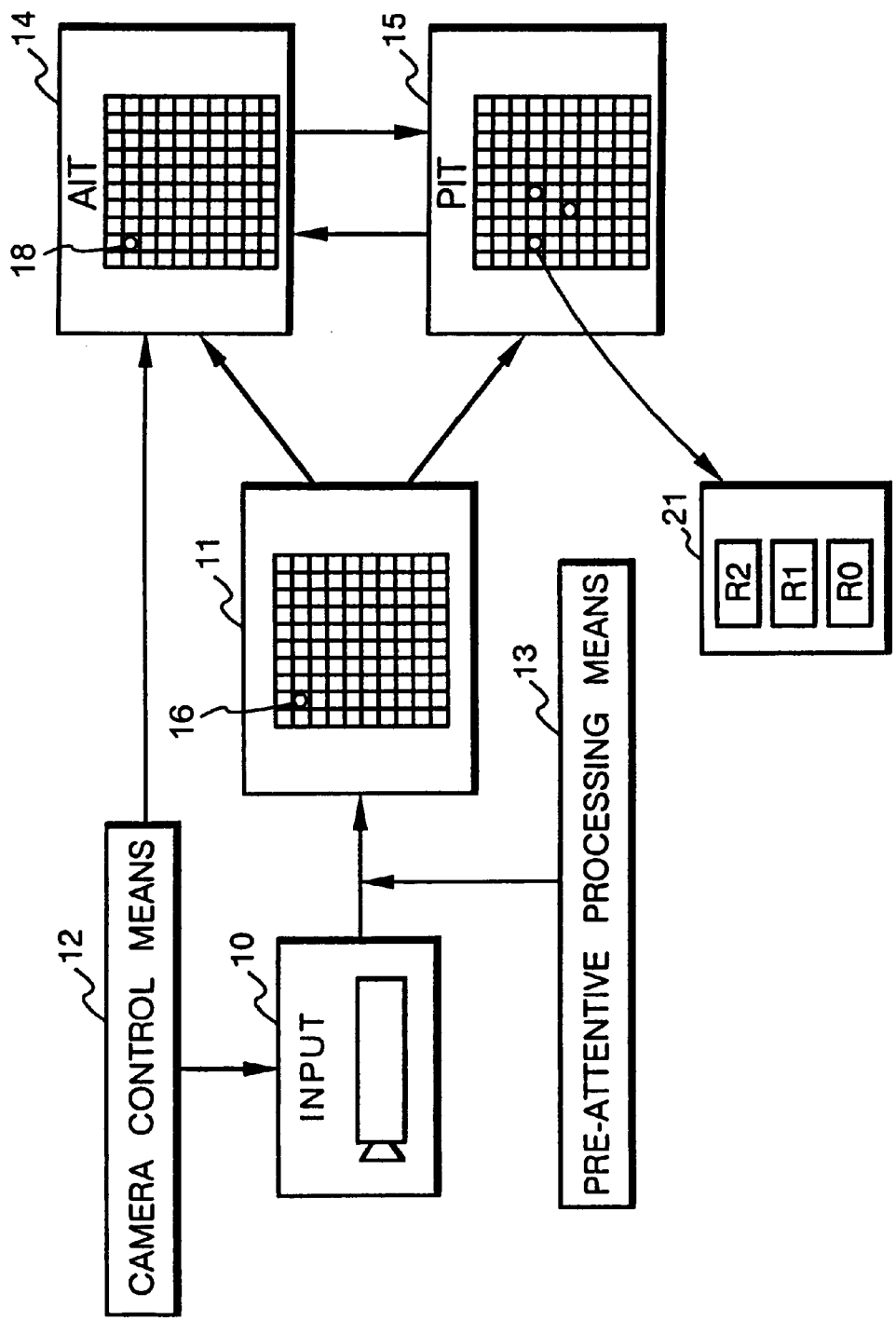
FIG. 1 is a view for describing the overall system structure of the present invention.

As shown in FIG. 1, visual image information containing an image of an object to be recognized is input via a suitable optical means, such as video camera 10, and is stored digitally as a pixel frame according to known prior art techniques. A controller 12 is attached to the camera 10, so that the camera can be considered as having functions analogous to the functioning of the human eye, wherein a focus thereof is adjusted on a portion of the image, and the camera 10 is operated so as to be separately directed to a specified fixed portion only of the image.

In order to selectively limit the image of the object to be recognized from the overall image information, the input image information is processed in a pre-attentive processing means 13. The pre-attentive processing means 13 can comprise means for conducting filtering, for example a low transmission filter or color filter, or depending on the circumstances, can include motion detection means for specifying an object from inside the overall image, or other processing means for normalizing the scale of the object.

The pre-attentive processing means further includes means for conducting processing for normalizing contrast to compensate for changes in the input image brought about by changes in illumination during camera input, or to compensate for changes in the input image brought about by linear response characteristics of an employed CCD camera.

Although not shown in the figures, the overall structure of the system additionally comprises a graphics or image processing board, along with a keyboard and/or mouse, for enabling user access to the system. Such devices, and their use, of course are well known in the relevant technical field.

Image information, which is pre-processed and digitized as described above, is input into a memory area 16 of a frontal module 11, having therein a memory means, as well as processing means for conducting principal component analysis.

The image information input to the memory of the frontal module 11 can be limited to image information of the object to be recognized, as limited by pre-processing, or if the background makes up important information for recognizing the object, the overall image information may also be input.

By means of operational commands, the image information input to the memory means of the frontal module 11 is delivered to an analysis system, wherein the analysis system, as conceptually illustrated in FIG. 1, is made up of two subsystems 14 and 15, which shall be explained in further detail below.

The first subsystem is a local image processing means 15 (hereinafter abbreviated as the PIT, in reference to the Posterior Inferior Temporal area of the human brain), and the second subsystem is a global image procession means 14 (hereinafter abbreviated as the AIT, in reference to the Anterior Inferior Temporal area of the human brain). The AIT and PIT are respective processing areas making up part of the visual pathways responsible for visual perception in the human brain. The relation of the AIT and PIT to biological visual processing is further explained in U.S. Pat. No. 5,675,663 by Koerner et al., the full disclosure of which is also explicitly incorporated into the present specification by reference.

The PIT subsystem 15 is responsible for analytical processing of localized images (local icons) which make up portions of the image to be recognized, and comprises plural modules for conducting analytical processing corresponding to local image possessing characteristics useful in recognizing the overall image (global icon). These analytical processing modules are hereinafter referred to as local modules 21.

The local modules 21 are configured for correspondence with a local topology with respect to the global image, wherein topology-corresponding image information from the memory means of the frontal module is delivered to respective corresponding local modules 21.

It is preferable that the image information input to the local modules 21 be extremely compressed information due to PCA processing, and the like, in the frontal module 11. More specifically, the information input to each local module 21 is information representing simple forms or blobs, wherein based on such information, all or specified neighboring local modules 21 extract characteristics of the input information simultaneously in parallel. The extracted characteristics associate modules 21 which are most closely consistent with modules 21 having specified learned images, and further, work in concert with the AIT subsystem 14, wherein ultimately a consistent local image is specified.

The AIT subsystem 14 is input with global image information from the frontal module 11, and extracts global characteristics of the global image to be recognized, performing analytical processing for evaluating consistency thereof. The AIT subsystem 14 is further input with local images from the PIT subsystem 15, and evaluates consistency thereof with the global image, thereby ultimately performing recognition of the input image from all characteristics which are mutually consistent.

For example, if the object of recognition from within the input camera scene is a face or an automobile, in the case of a face a locus is defined by a limited part from inside the face, for example the eyes, nose, mouth, or facial outline can be taken as a locus, and in the case of an automobile a front panel, side shape or wheel shape can be so defined.

In the present invention, based on the above-described system structure, at the initiation of image processing, feature information of input images generated from image information of simple forms or blobs which are not yet fully evaluated are presumed by hypothesis, wherein by means of multi-agent calculations which gradually form an interpretation of overall consistency in an analog manner, between modules 21 and/or during communication with the AIT subsystem 14, image recognition is performed based on hypothetical deductions.

The PIT subsystem 15 is made up of an arrangement of plural local modules 21 corresponding to locations of the image to be recognized, wherein each local module 21 is arranged under a condition in which the position of its concerned local image region is associated with an input topology as a principal measurement thereof.

The AIT subsystem 14 is constructed as a module for processing the global image. Because it handles global characteristics of the image, there is no relationship with input topology as in the case of the PIT subsystem 15.

The structure and functions of each local module 21 of the PIT subsystem 15 shall now be explained with reference to FIG. 2. In order to facilitate explanation, elements of the system, along with other relevant terminology, shall be defined as follows.

Each local module 21 is made up from three sub-modules R0, R1 and R2. More specifically, the following image processing route, as shown below, results:

Camera→Frontal Module→R0→R1→AIT

Each module acts as an agent for image processing, each respectively interpreting input data, and thus can be expressed by the term "agents." An agent which is close in input to a first agent and which serves as a standard is referred to as a "lower order" agent. Further, an agent which is closer to the AIT than the standard agent is referred to as a "higher order" agent.

An agent of a another local module having the same position as the standard agent is referred to as a "same order" agent. More specifically, for a certain local module, the frontal module 11 is a lower-order agent, the module making up the AIT subsystem 14 is a higher-order agent, and other local modules of the PIT 14 may be considered as same-order agents.

Further, local modules 21 are structured so as to group together items which are similar in topology, or items which resemble one another in the form of their given local images. Agents which are members of the same group as the standard agent are referred to as "neighboring" agents.

Further, in image information processing according to the present invention, "bottom-up processing" is conducted in which information progresses from lower-order agents toward higher order agents, in the direction of the arrows shown above; as well as the reverse flow, namely, "top-down processing" is conducted in which information is controlled from higher order agents toward lower order agents.

Figure 2:
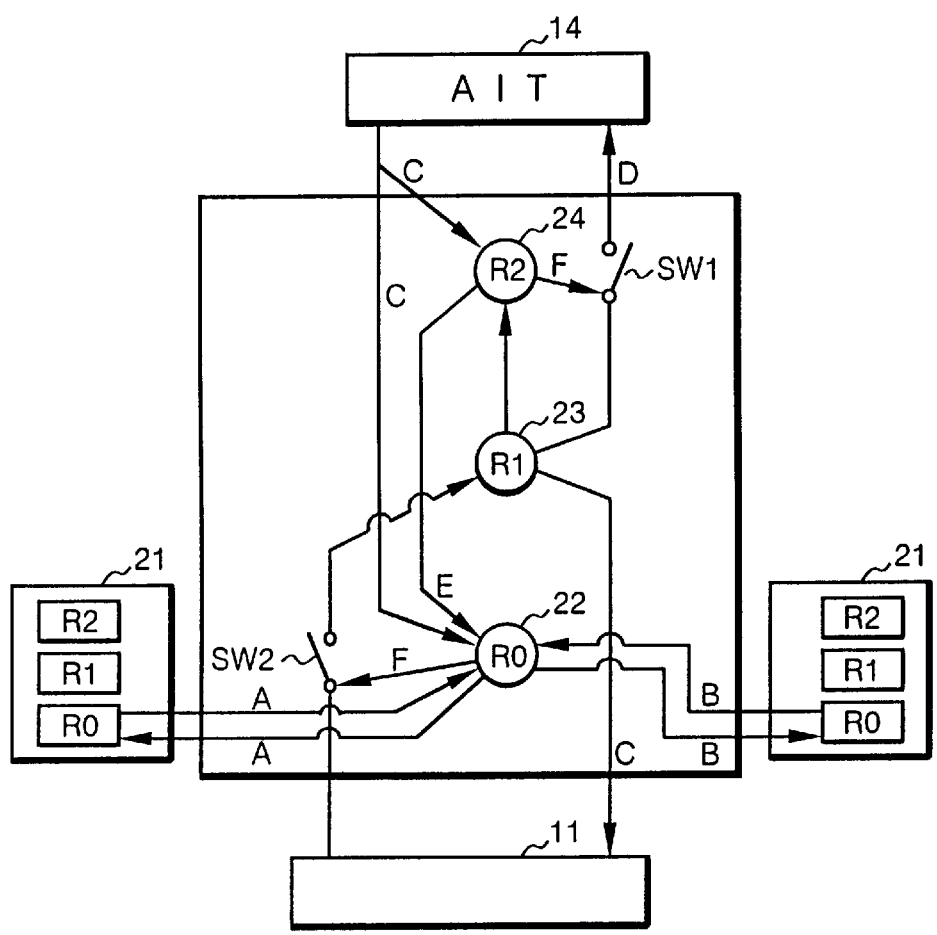
FIG. 2 is a view specifically showing control signals input/output by the sub-modules making up the local module, and further explaining the higher order module (AIT) and lower order module (input/output control means).

In FIG. 2, R0 sub-module 22 holds information of an average vector $\Psi$ of learned images of a given locus. In the case of a human face, as conducted in the simulation of the presented invention to be described later on, for an average vector $\Psi$ of the R0 sub-module of a nose referent local module, N-dimensional local data M are collected from M images centered on the nose, and each data is summated with a normalized N-dimensional vector $\Gamma_i (1 \leq i \leq M)$, thereby determining an average vector $\Psi$ from the following equation (3).

$$\Psi = M^{-1} \sum_{i=1}^{M} \Gamma_i \qquad (3)$$

The activity of the R0 sub-module 22 is a "hypothesis control agent" which expresses the strength of the hypothesis. With respect to normalized new image information $\Gamma_{NEW}$ which is input, the initial value thereof becomes a vector value $\Gamma_{NEW} \cdot \Psi$ which is considered as an initial hypothesis. The value of the R0 sub-module 22 is controlled, by control signals from neighboring or higher order agents, so as to subsequently issue an output, progressing toward globally consistent image recognition.

The R1 sub-module 23 possesses knowledge U of the eigenspace of an object image learned of a given object. The eigenspace is determined by the processing described below. Taking the least square best fit distribution of a vector $\Phi$, obtained by subtracting the average vector $\Psi$ from the N-dimensional vector $\Gamma_i$ of the local image data ($\Phi_i = \Gamma_i - \Psi$), an orthonormal vector $u_k$, as shown by equations (4-1), is sequentially summated from k=1 to k=M' (M'$\leq$M), $$\lambda_k = M^{-1} \sum_{i=1}^{M} (u_k^T \Phi_i)^2 \qquad (4\text{-}1)$$

$$u_i^T u k = \delta lk = 1 \quad (\text{if } k = l) \qquad (4\text{-}2)$$
$$= 0 \quad (\text{Otherwise})$$

wherein the k sub-scripted vector $u_k$ is selected to maximize equation (4-1) under the condition of equation (4-2).

Vector $u_k$ and scalar quantity $\lambda_k$ respectively become the eigenvector and eigenvalue of the covariant matrix C expressed by equation (5) below. The space derivable from the vector $u_k$ is referred to as the eigenspace of this location.

$$C = M^{-1} \sum_{i=1}^{M} \Phi_i \Phi_i^T \qquad (5)$$

The vector $\Gamma_{NEW}-\Gamma$ expressing the characteristics of the input image $\Gamma_{NEW}$ which are extracted by the R0 sub-module 22 are projected onto the eigenspace U which expresses separate characteristics of the learned local image in the R1 sub-module 23, thereby calculating the projected distance to the eigenspace of the input vector (hereinafter referred to as a "distance from feature space" or DFFS).

Local image information input to the R1 sub-module 23, through switch SW2 which is activated upon evaluation of characteristics in the R0 sub-module, can be highly accurate information input from the memory of the frontal module 11.

Further, in the R1 sub-module 23, based on a signal issued by a higher-order agent, top-down control is conducted for controlling the lower-order agent by reverse mapping, by which the eigenspace vector U is projected onto the input local image vector.

In the R2 sub-module 24, the projected distance (DFFS) to the eigenspace of the input vector is employed as principal information for evaluating consistency between the input local image and the projected eigenspace.

Recognition of the input local vector $\Gamma_{NEW}$ is conducted based on the projected distance DFFS toward the eigenspace U of the input local vector $\Gamma_{NEW}$, as determined from the scalar product of the feature vector $\Gamma_{NEW}-\Psi$ and the eigenvector $u_k$.

Further, based on top-down control from the AIT subsystem, which is an upper-order agent, the R2 sub-module receives control concerning the evaluation of consistency of the input local image based on bottom-up processing, as discussed above.

The AIT subsystem 14 is made up of a module 18 for conducting analytical processing of the global image. The module 18 can be constructed in the same manner as the previously described local module 21. More specifically, it is constructed of sub-module s R0, R1 and R2, and the knowledge and functions possessed by each sub-module, aside from the image object becoming a global image in place of a local image, are entirely the same as described above.

FIG. 2 illustrates, using arrows, control operations of the sub-modules 22, 23 and 24, wherein such control operations shall be described below. As main control operations, there are four types of control operations between local module s, whereas, there are two types of internal control operations between sub-modules of the same local module.

First, control operations between local modules, or between the local modules and higher order or lower order agents, shall be described.

① Local Activation Control, A-Type (shown by A arrows)

In the PIT 15, when a sub-module 22 of one local module 21, from among plural local modules 21 in charge of input images having different topologies of a given characteristic location, is activated, outputs are issued to the R0 sub-modules 22 of other local modules which are in charge of the same characteristic local image, thereby activating them. As a result, the R0 sub-modules of all local modules 21 in charge of the concerned characteristic location are activated, and image processing of the input image progresses. For example, supposing among plural local modules in charge of image processing of a nose, the R0 sub-module 22 of a local module 21 to which certain topology information is input is activated, then the R0 sub-modules of all local modules in charge of image processing of the nose are activated, thereby causing image processing of the nose to progress.

In particular, from among the local modules making up neighboring agents, as a result of this control, conjectures concerning characteristics of local images of resembling images, or whether there are similar topologies, can be formulated in a shortened time period.

② Local Deactivation Control, B-Type (shown by B arrows)

In the case that plural local modules 21 in charge of local images having differing characteristics receive image information from regions having similar topology, when the R0 sub-module 22 of a specific local module 21 is activated, deactivation signals are issued to the R0 sub-modules of local modules which are in charge of other characteristic local images. As a result, competition among plural hypotheses directed to image information of regions having similar topology is prevented.

③ Top-Down Control, C-Type (shown by C arrows)

Top-down control is a control directed at lower order agents by which the activated agents themselves receive inputs. In a local module 21, local image information for which consistency has been determined is reevaluated based on a template for evaluating consistency of the local image which is provided in the AIT subsystem 14. If an inconsistent condition is judged in the AIT subsystem, operation of the concerned local module 21 is halted by a deactivation signal.

When inconsistency is judged in the R0 sub-module of the local module 21, a deactivation signal is sent to the lower-order agent frontal module 11, whereby input of image information to the concerned local module 21 is controlled.

Further, based on an evaluated result of consistency by global image processing in the AIT subsystem 14, an activation signal is output to local modules 21 which are currently in a deactivated state and which are in charge of characteristic local images of the concerned global image, thus prompting operation of such local modules.

④ Bottom-Up Control, D-Type (shown by D arrows)

If an evaluated value, taking as main information the projected distance DFFS in the R2 sub-module 24 of each local module 21, is greater than a threshold value, switch SW1 is closed, and an output is issued to the AIT subsystem as local image information indicative of consistency with the eigenspace information in the R1 sub-module 23.

When it is judged that the evaluated value of the R2 sub-module 24 exceeds a threshold, based on bottom-up image processing in the local module 21, if the input image is sufficiently described from the information held in each local module 21, consistency can also be confirmed based on top-down processing (C-Type) from the AIT subsystem 14, and from image information of the activated local modules 21.

The following shall now describe the two types of control operations undertaken between the R0, R1 and R2 sub-modules which make up the local modules.

① Local Module Internal Top-Down Control, E-Type (shown by E arrows)

When an evaluation value in the R2 sub-module 24 making up the local module 21 is judged to exceed a threshold value, the R2 sub-module 24 deactivates the R0 sub-module 22 of the same local module 21. If the evaluation value of the R2 sub-module becomes greater than the threshold, based on the aforementioned bottom-up control (D-type), information in the R1 sub-module 23 is output to the AIT subsystem through switch SW1, and should this indicate consistency, recognition of the local image is completed.

In the case that activation of the R0 sub-module continues, based on the aforementioned local deactivation control (B-Type), R0 sub-modules 22 of different local modules 21 having input thereto image information of resembling topology remain deactivated. This causes the sequence seeking options, if recognition of the local image is still in an unconfirmed condition, to become narrowed. Based on deactivation of the R0 sub-modules of local modules for which recognition has already been completed, it becomes possible for other local modules 21 making up neighboring agents to be activated.

② Local Module Internal Sub-Module Input Control, F-Type (shown by F arrows)

In local module 21, so long as the value of the R0 sub-module 22 does not exceed the threshold value, switch SW2 is not closed, and image information is not input to the R1 sub-module 23. When it is judged that the level of extracted characteristics from the R0 sub-module 22 is greater than the threshold value, switch SW2 closes and image information which is projected from the frontal module 11 onto the eigenspace of the R1 sub-module 23 is input As a result of such control, unnecessary calculations are avoided and computer load is lessened, together with improving the quality of image information which is projected by the R1 sub-module 23, while also minimizing noise attributed to higher-order agents.

Similarly, until the value of the R2 sub-module also exceeds a threshold, and its consistency is evaluated, control is effected by switch SW1 such that image information from the R1 sub-module 23 is not transmitted to the AIT subsystem 14.

Figure 3:
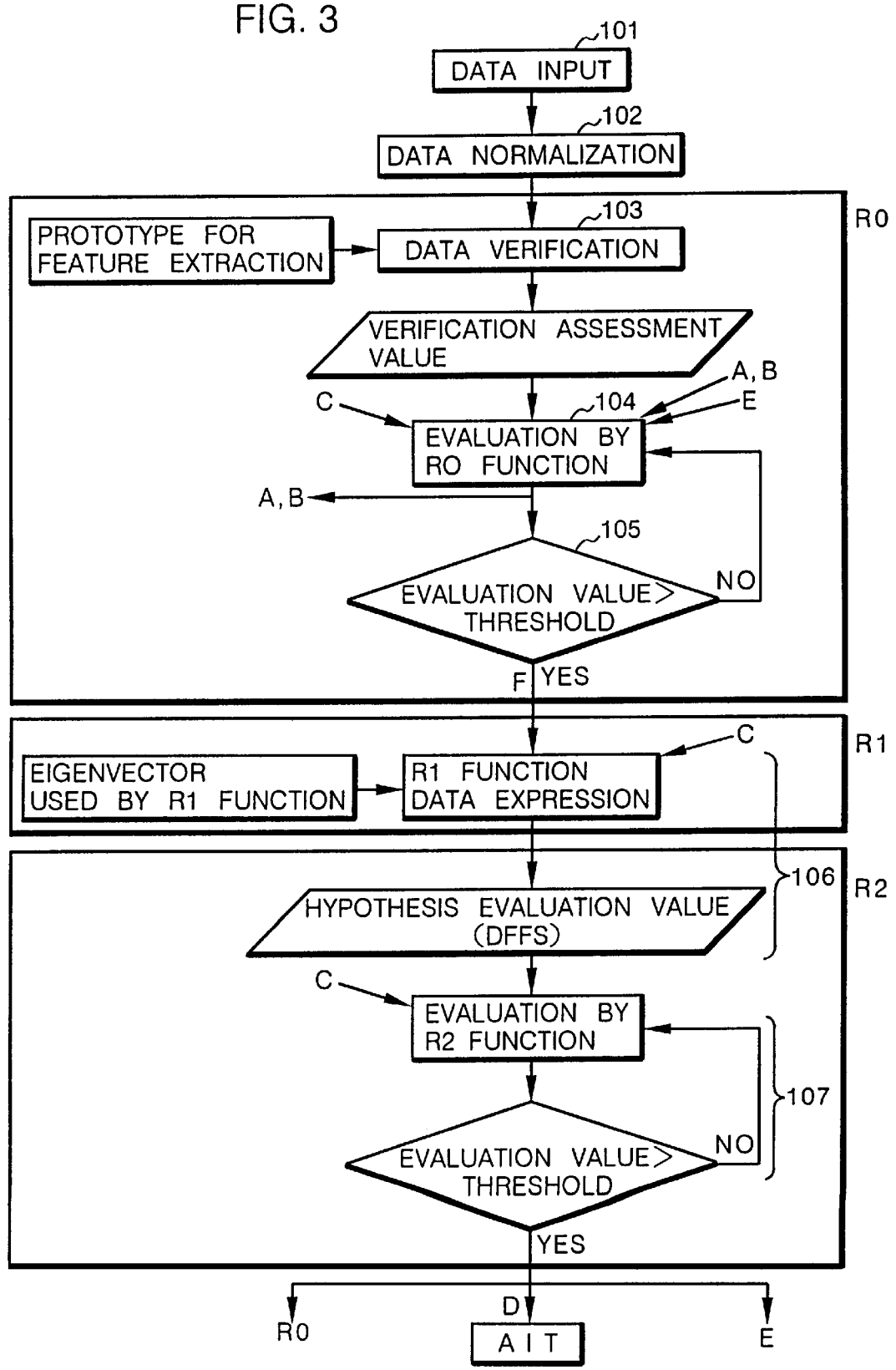
FIG. 3 illustrates overall image processing flow in the local module.

FIG. 3 illustrates overall image processing flow in the PIT subsystem 15.

The explanations below are presented, by way of example, referring to an actual simulation according to teachings of the present invention which was performed for recognizing a human face. However, the human face is but one example of an object image which is made up of several components by sub-designation, and which is suitable for such a structurally designated description. The application of the present invention is by no means limited to recognition of faces, and the techniques herein are applicable to any type of image recognition in which recognition of an input global image is performed based on reconstruction of the global image from plural local images.

The simulation of the present system was effected using a Sun SS10 Workstation which was programmed in GNU C++ code.

The data provided in Step 101 is image data of a scanned pixel region from a window of attention optionally set from within a global image input from a camera. In Step 102, necessary preprocessing, such as normalization processing to compensate for variations in the input image data brought about by variations in illumination at camera input, or variations in the input image data brought about by linear response characteristics of a CCD camera, or scale normalization processing and the like, are performed, and thereafter the data is stored in a memory area of the frontal module 11.

Based on scan position information of the window of attention, the image information stored in the memory is respectively input to the R0 sub-modules of local modules corresponding to the input topology. Appropriate PCA processing may also be performed on the input image information by the frontal module 11.

The R0 sub-module 22 is defined by an average vector of all locations corresponding to pixel position, taken from plural image data gained from learning concerning all local images. In the present simulation, an average vector of a 200 dimensional vector of principal components, concerning the left and right eyes, nose and mouth and 12 types of distinct facial outlines, was used.

In Step 103, the R0 sub-modules 22 of each local module 21 conduct pattern matching using the average vector from the input local image data as a template, and output an analog signal corresponding to the distance therefrom.

The R0 sub-module can scan a vicinity (3×3 pixel region) of the input local image, and select the input local image exhibiting the greatest activity.

However, because pattern detection ability, when subjecting such a type of average vector to templating, is low and produces ambiguities, the R0 sub-module can also be considered as a hypothesis generator.

The knowledge possessed in the R0 sub-module as an average vector is expedient for feature extraction of the input image information, and extracted characteristics can be output to the R1 sub-module 23 and projected onto eigenspace. However, considering the R0 sub-module as a hypothesis generator as described above, in the case that image information output to the R1 sub-module is made up such that, corresponding to the degree of activity of the R0 sub-module 22, very high dimensional image data is input from the memory of the local module 11, a simple template can be used from relatively few principal component vectors, as knowledge of the R0 sub-module 22.

In Step 104, the result of the above-described consistency determination is specified as a verification assessment value. In the present embodiment, evaluation of consistency in the R0 sub-module 22 is undertaken by the R2 sub-module 24. More specifically, the R2 sub-module 24 is constructed as a module for performing evaluation of image information processing of the R0 sub-module 22 and the R1 sub-module 23.

In Step 104, controls are received based on activation inputs (Arrow C) from the above-stated AIT subsystem 14, deactivation (Arrow B) and activation (Arrow A) signal inputs from other local modules 21, and deactivation signal inputs (Arrow E) from the R2 sub-module 24 of the local module 21 itself. In the case that deactivation signals are not input and activation is maintained, evaluation is made using an R0 function, and based on the result of that evaluation, output to other agents are performed. The R0 function is expressed by the following equation (6)

$R0[k][y][x](t)$ $=f($the value based on the distance between template K and local input $+$local activation control from a different neighboring local module, A-Type $-$local deactivation control, B-Type $+$lower-order agent top-down control, C-Type $-$local module internal top-down control, E-Type $-$normalization based on total $R0$ activity $=f($template$[k]\cdot$localinput$[y][x](t-1)$ +w_Neighbor_Act*$\Sigma_{neighbor\ yy,xx}$R0[k][yy][xx](t−1)

−max$_{kk\neq k}$R0[kk][y][x](t−1)

+w_Next_Feedback_Act*ACT_NextR1[k][y][x](t−1)

−R2[kk][y][x](t−1)

−max ($\Sigma_{kk,yy,xx}$R0[kk][yy][xx](t−1)−INH_NextR2(t−1,0))  (6)

wherein, k is a suffix expressing local characteristics, y and x are suffixes expressing column position, t is a time step of the dot operator, coefficients starting with w represent weightings, such that w_Neighbor_Act=0.5 and w_Next_Feedback_Act=0.2 are set at such values in all R0 sub-modules 22, f is the monotone increasing function f ∈[0, 1], template[k] is the M dimensional vector for the template and localinput[y][x] is the M dimensional vector of the input image data input to the R0 sub-module.

In the R0 sub-module 22, as described by items of the aforementioned control operations, based on control signals of the local activation control (Arrow A) or local deactivation control (Arrow B) from the R0 sub-module of another agent, activation or deactivation control is received, and further, top-down control is received from the R2 sub-module 24 and the AIT subsystem 14. Top-down control (Arrow E) from the R2 sub-module 24 is a deactivation control; and thus, image processing concerning hypotheses already interpreted by upper-order agents with respect to the signal processing level of the R0 sub-module 22 are halted.

AIT subsystem top-down control (Arrow C) involves both activation and deactivation. Local module 21 conducts image processing, and local image information for which consistency has been evaluated is projected onto the global image in the AIT, wherein based on the reevaluated result, functions of the local module are subjected to top-down control. In Step 105 (according to the present embodiment, Step 5 is performed in the R2 sub-module 24), if a value f based on a distance between the template k and the input image data vector is above a given threshold, local image information is output from the memory of the frontal module 11 to the R1 sub-module 23 of the same local module.

Further, based on the evaluation in Step 104, A-Type and B-Type control signals are output to the R0 sub-modules of other local modules.

The R1 sub-modules 23 contain eigenspace knowledge based on learned individual image information of each local image. In the actual face simulation, from among a 200 dimensional vector of learned image information, vectors composed of 20 large value upper-order components were used as principal components, and individual eigenspaces of the local images were generated.

In step 106, when the R0 sub-module 22 of the local module 21 is activated, input image information of the concerned location is output from the memory of the frontal module 11 to the R1 sub-module 23.

The input local image information $\Gamma_{NEW}$ is a vector expressing characteristics subtracted by the average vector, wherein a principal component vector, composed of 20 upper-order components of the concerned vector, is projected onto the individual eigenspaces possessed by the R1 sub-modules 23. The is expressed more concretely by equation (7)

R1[k][y][x][j](t)

=PC[k][j]·(localinput[y][x](t−1)−Mean[k])

(if R0[k][y][x](t−1)≧R0_threshold, wherein the hypothesis is created), or

=R1[k][y][x][j](t−1)

(if R0[k][y][x](t−1)R0_threshold, wherein activation is temporarily maintained)  (7)

wherein, suffixes k, y, x and t are the same as those for R0 in equation (6), j is a suffix of the eigenvector, PC[k][j] is the j-th eigenvector of location k, Mean[k] is the average vector of location k, and localinput[y][x] is the M-dimensional vector for the input local vector information input to R1.

The input local image vector in the R1 sub-module 23 and projected eigenspace distance DFFS contained as information in the R1 sub-module 23 are used for evaluating image recognition, wherein this evaluation is undertaken by the R2 sub-module 24 in Step 107.

The R2 sub-module which performs the evaluation in Step 107 receives top-down control (C-Type) from the AIT subsystem which activates a priority operated local module 21, based on a global image processing result in the AIT subsystem 14 which serves as an upper-order agent.

Based on such control signals, unnecessary processing in the R2 sub-module 24 is deactivated, wherein processing time for image recognition of the overall system is shortened.

Equation (8), below, expresses the evaluation in the R2 sub-module 24.

R2[k][y][x][j](t)

=1.0 (normalization factor)

+‖R1[k](t−1)‖²R1 activation and image information to the AIT subsystem, F-Type control)

−‖Mean[k]−localinput[y][x](t−1)‖² (distance between input image and average vector)

−maxR2[kk][y][y](t−1)(local module deactivation, E-Type control)

+ACT_NextR1[k][y][x](t−1) (AIT top-down, C-Type control)  (8)

In the evaluation in the R2 sub-module 24 performed in Step 107, if the evaluation level is above a threshold, the local image information of the R1 sub-module 23 is output to the AIT subsystem 14 serving as an upper-order agent (Arrow D).

Further, the R2 sub-module of the local module which receives C-Type top-down control from the AIT subsystem 14 and is activated thereby, outputs a reverse mapping, which is a projection of the eigenspace in the R1 sub-module 23 onto the input image vector, as a top-down hypothesis (Arrow R0).

In the R2 sub-module 24, when an evaluation of consistency taking the projected distance DFFS as principal information exceeds a threshold value, and the input image is recognized, a self-deactivation control signal (Arrow E) is output to the R0 sub-module.

The AIT subsystem 14 is constructed as a module for analytical processing of image information of the global image, into which global image information from the frontal module 11 and local image information processed by each local module 21 from the PIT subsystem 11 is input, thereby performing recognition of the global image which is consistent with each local image.

The AIT subsystem 14 modules are constructed similarly to the above-described local modules 21 and R0, R1 and R2 sub-modules. The functions thereof, and the functions of the relevant sub-modules of such local modules 21, are substantially the same. More specifically, the R0 sub-modules possess knowledge of the average vector of learned global images, as well as a template function for extracting characteristics of the input global image. The R1 sub-modules possess information of individual eigenspaces of learned global images, and a function for projecting the global image information onto eigenspace, based on evaluation from a template of the input global image in the R0 sub-module. The R2 sub-modules possess knowledge of a threshold value of the projected distance DFFS, and using the expression value of the R1 sub-module, perform evaluations to determine consistency based on the DFFS.

In the simulation for recognition of human faces according to the present invention, the average vector in the R0 sub-module of the AIT subsystem 14 was defined by an average vector of image data (105×105 pixel positions ×3 principal component vectors) which was appropriately centered and selected from global images (128×128 pixel positions ×200 principal component vectors) of faces of 35 people, from out of 105 individual's learned facial images.

Figure 4:
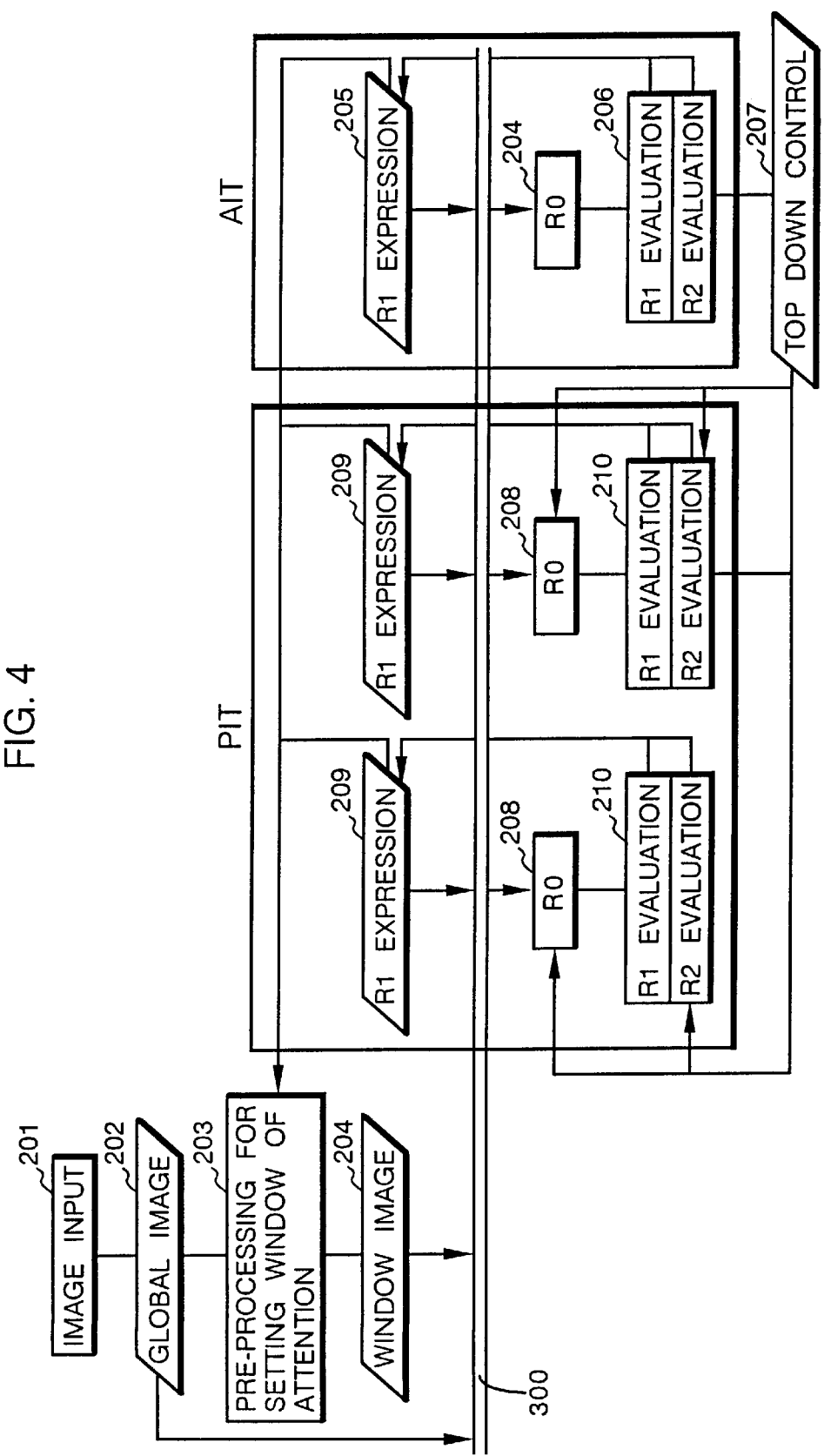
FIG. 4 illustrates image analysis processing flow of the overall system.

The 105×105 pixel positions define a pixel region making up a window of attention 203 as shown in FIG. 4. The position of the face cannot be specified from the input image of an actual camera alone; and therefore, based on an instruction from the AIT subsystem 14, the camera is scanned, wherein based on template matching in the R0 sub-module 204, the position of the window of attention is decided.

The AIT subsystem 14 further possesses a template relating to local image information input from local modules 21 of the PIT subsystem 15. Initially, the template is the same average vector as that of the R0 sub-module 22 of the local module 21 of the PIT subsystem 15. But also, depending on the circumstances, based on an evaluation of the global image in the AIT subsystem 14, the template can be an eigenspace derived from a high multidimensional vector, as a template with respect to image information from the local module 21 of the PIT subsystem 15 which has been top-down activated.

The size of the window of attention defined by the AIT subsystem 14 is 105×105 pixels, whereas the local image which is input to the AIT subsystem 14 from the PIT subsystem 15 is defined by 35×35 pixel positions ×16 locations. In the actual simulation, taking into account computer calculational ability, a vector defined by 12×12 pixel positions ×16 locations ×20 components was used.

Referring to the flowchart of the overall system of the invention shown by FIG. 4, an illustrative example, based on a face simulation, shall now be described.

An image input by the camera is stored in a memory area 202 of the frontal module 11, as a global image comprised of digital data which has been subject to the aforementioned normalization processing. In the present simulation, a 128× 128 pixel region, 256 tonal density image was used.

Via a global image data base 300, the image is input to the AIT sub-system 204. The global facial image (3 principal component vector) is evaluated by template matching in the R0 sub-module 204 to judge whether it is a human face or not, and features of the input facial image are extracted using an average vector template. Following evaluation in the R0 sub-module 204, the facial image is projected onto the eigenspaces of faces of 105 individuals in the R1 sub-module 205.

In the R2 sub-modules 206 of the AIT sub-system 14, the DFFS values are determined and compared against a threshold value. By the evaluation in the R2 sub-module 206, in the case that one DFFS of eigenspace is specified by the threshold value, the input facial image may be recognized as an individual's face specified by that eigenspace. However, considering the need to simplify calculation and calculational speed, only a few principal component vectors may be sampled, and for performing the above image information processing, plural eigenspaces may be specified in the evaluation of the R2 sub-module 206.

In this manner, an activation signal is output as a top-down control to local modules of the PIT subsystem in charge of local images belonging to the face (global image) of the plural specified eigenspaces.

On the other hand, the input global image is scanned by a window of attention 204 set based on topology information of local modules of the PIT subsystem, and is input to corresponding local modules based on a data base 300 formed by local images of the mouth, nose, left and right ears and 12 facial outline segments.

For example, for local image data input to a nose local module, the learned average vector of the nose in the R0 sub-module 208 is used as a template, thereby enabling the data to be recognized as being a nose image, and simultaneously, the characteristics of the input nose image are extracted.

Once the input local image is evaluated as being a nose, component vectors expressing characteristics extracted by the R0 sub-module 208 are projected onto the eigenspace of the nose in the R1 sub-module 209. Alternatively, high-dimensional input image information from the memory of the frontal module 202 is input and projected onto the eigenspace of the nose in the R1 sub-module 209. The projected distance DFFS obtained as a result of this projection is evaluated based on a threshold value in the R2 sub-module 210, and when a judgment of consistency occurs, input image information of the R1 sub-module 209 is output through the AIT subsystem 300, wherein consistency with the global image is evaluated based on a template in the AIT subsystem.

In this case, in place of the input image information of the R1 sub-module, high dimensional input information from the memory of the frontal module 202 may as be input to the AIT subsystem. Should this be done, highly precise image recognition can be achieved by projecting image information of higher dimensional principal components onto the eigenspace.

In the R0 sub-module 208 of the PIT subsystem, when the fact of a nose image has been recognized, B-type control signals are output to other neighboring local modules, controlling operation of other local modules which process the same local image information. Also, A-type activation control signals are output to R0 sub-modules of different local modules in charge of processing other local images having resembling topologies, for thereby promoting processing therein.

When consistency is confirmed by evaluation in the R2 sub-module 210, E-type control signals are output to the R0 sub-module 208 of the same local module for deactivating operation thereof.

Based on an evaluation of consistency by global image processing in the AIT subsystem, in local modules of the PIT subsystem which are activated by top-down control, concerning local image information evaluated by the R0 sub-modules therein, it is also acceptable if only the projected distance DFFS between concerned local images of individuals recognized in the AIT subsystem and the eigenspace is evaluated.

In the case where plural individuals are hypothesized by top-down control and taken as local modules, during evaluation in the R2 sub-module, if the local image of one such individual is recognized, at that level, the global image is specified and recognized.

If the input image is that of an unlearned object, recognition for specifying the input image as a result is also possible. In the case of such yet unlearned input images, by establishing functions for automatically adding such image processing information to the knowledge of sub-modules of each subsystem, a system capable of self-learning can be obtained. Furthermore, by memorizing recognized images which are consistent with features of input image information for which image recognition has been performed once, and/or by memorizing eigenspaces of each subsystem for which consistency has been confirmed, modules possessing information of eigenspaces corresponding to input image characteristics can be activated in priority, resulting in a system having high learning efficiency.

FIG. 5 shows visually the progression of image processing in local modules in the simulation. More specifically, FIG. 5(a) shows a case in which top-down processing from the AIT subsystem is not performed, whereas FIG. 5(b) shows the case, recognizing the same input image, yet wherein top-down processing from the AIT subsystem is performed. In the figures, time steps (one step equaling 5 milliseconds) are represented in the columnar direction, whereas line 1 shows a progression of global image processing in the AIT subsystem.

Line 2 shows the activation state of the R2 sub-modules of 16 local modules of the PIT subsystem. The lines therebelow show, in time series, activation states of the R0 sub-modules of local modules for the right eye, left eye, nose and mouth, respectively.

Unlearned images were used for the input image shown in FIG. 5. In the case of FIG. 5(a) in which top-down control was not performed, first the facial outline was detected, and immediately thereafter, both eyes and the nose were detected. However, because an average vector was uses as a template for the R0 sub-module, numerous mistakes resulted in recognition of the left and right eyes, and further, up through nine steps, the mouth could still not be detected.

In the case shown by FIG. 5(b), in which top-down control from the AIT subsystem was performed, detection of the facial outline, both eyes and nose were similar to the case of FIG. 5(a). However, by step 5, the mouth was also detected. Comparing the activity state of the R0 sub-module in FIGS. 5(a) and 5(b), it can be judged that activation in the R0 sub-module was less when top-down control was performed. This demonstrates that, due to top-down control, the activities of inconsistent sub-modules were suppressed, and it can be understood that, from among less activity information, the most consistent data was selected in the R2 sub-module.

Further, as understood from the time sequence variations of global image processing in the AIT subsystem shown by line 1, at first it was weak and coarse, but gradually became more detailed. Accordingly, it is understood that top down control becomes more detailed and precise over time.

Chart 1 shows detection rates for locations of the eyes, nose and mouth in respect to 105 facial images used in the simulation. From the chart, it can be appreciated that, even when compared to the detection rate using the prior art eigenspaces method, the image recognition method according to the present invention offers a substantial improvement in detection ability.

CHART 1

Detection Rate for Local Characteristics
(no. detected/no. of cases)

| Rates | A<br>Simulation by<br>Present Invention | B<br>Eigenspace<br>Method Only |
|---|---|---|
| Detected (Eyes) | 99.5% (209/210) | 94.3% (198/210) |
| Mis-detected (Eyes) | 0.0% (0/210) | 0.0% (0/210) |
| Undetectable (Eyes) | 0.5% (1/210) | 5.7% (12/210) |
| Detected (Nose) | 100.0% (105/105) | 92.4% (97/105) |
| Mis-detected (Nose) | 0.0% (0/105) | 0.0% (0/105) |
| Undetectable (Nose) | 0.0% (0/105) | 7.6% (8/105) |
| Detected (Mouth) | 99.0% (104/105) | 76.2% (80/105) |
| Mis-detected (Mouth) | 0.0% (0/105) | 0.0% (0/105) |
| Undetectable (Mouth) | 1.0% (1/105) | 23.8% (25/105) |

In the image recognition system according to the present invention, recognition processing of a global image and local images are performed simultaneously in parallel by plural modules whose functions are distributed. Further, processes which are inconsistent are quickly deactivated by deactivation signals between processing modules, and further, due to functions for which image processing in local modules necessary for recognition of the global image are promoted, it becomes possible to reduce computational load while still enabling image recognition in a shortened time period.

Further, image processing according to the present invention, as a result of the above structure, provides a system in which at the initiation of image processing, globally consistent recognized forms are realized through multi-agent calculations on the basis on image recognition hypotheses from highly compressed data. Accordingly, probability evaluations which accompany complex equations such as maximum-likelihood analysis, as in the prior art, are not required.

Further, in image recognition according to the present invention, multiple local modules perform sequence sequential processing of input images, possessing both bottom-up processing flow reaching recognition of a global image, and top-down processing flow in which, through local module processing, hypothetical recognition obtained from a global image is confirmed. In processing agents which are in agreement with these two types of processing flows, at the point at which consistency is evaluated, because it can be considered whether true recognition of the global image has been established, image recognition in a rapid time period can be achieved.

What is claimed is:

1. An image recognition system for recognizing an object using a global image processing means and a local image processing means performing parallel processing on a global image of an object of recognition input from a camera or other optical pick-up device and on characteristic local images, comprising:

global image processing means for performing analytical processing on a global image, comprising means for extracting a global characteristic of an input global image and means for evaluating consistency of said extracted global characteristic;

local image processing means for performing analytical processing on a plurality of local images, said local image processing means being made up from a plurality of local modules corresponding respectively to each local image, each of said local modules comprising means for extracting a characteristic of an input local image and means for evaluating consistency of the extracted characteristic with the image to be recognized, wherein said global image processing means receives an input image and exchanges signals with said local modules, and deactivates functions of said local modules which are inconsistent with said global characteristic, while activating functions of said local modules which are consistent with said global characteristic, thereby effecting a hierarchical control wherein consistency evaluations made in said global image processing means influence activation or deactivation of functions in said local modules, and wherein respective local modules of said local image processing means control functions of said global image processing means based on signals indicating consistency with said local images.

2. The image recognition system according to claim 1, wherein each of said local modules making up said local image processing means comprises plural local modules corresponding to different topologies of the same local image, and determined by local images which correspond in location with each other.

3. The image recognition system according to claim 1, wherein each of said local modules making up said local image processing means comprises plural local modules corresponding to different topologies of the same local image, and determined by local images which correspond in form with each other.

4. The image recognition system according to claim 1, wherein each of said local modules making up said local image processing means comprises:

a first sub-module comprising means for extracting a characteristic of an input local image;

a second sub-module having stored therein knowledge of an eigenspace of a given local icon of a pre-learned object of recognition; and a third sub-module comprising means for evaluating consistency based on a projected distance from a result of projecting the image information of said input local image having the characteristic extracted by said first sub-module onto an eigenspace stored in said second sub-module.

5. The image recognition system according to claim 4, wherein said first sub-module has stored therein knowledge of an average vector of the given local image of said pre-learned object of recognition.

6. An image recognition system for recognizing an object from a global image of the object of recognition input from a camera or other optical pick-up device, and from characteristic local images, comprising:

global image processing means for performing analytical processing on a global image, comprising means for extracting a global characteristic of an input global image and means for evaluating consistency of said extracted global characteristic;

local image processing means for performing analytical processing on a plurality of local images, said local image processing means being made up from a plurality of local modules arranged in correspondence with a topology of a local image, each of said local modules comprising (a) a first sub-module comprising means for extracting a characteristic of an input local image, (b) a second sub-module having stored therein knowledge of an eigenspace of a given local icon of a pre-learned object of recognition, and (c) a third sub-module comprising means for evaluating consistency based on a projected distance from a result of projecting the image information of said input local image having the characteristic extracted by said first sub-module onto an eigenspace stored in said second sub-module, wherein said global image processing means receives both an input image and inputs from said local modules, and deactivates functions of said local modules which are inconsistent with said global characteristic while activating functions of said local modules which are consistent with said global characteristic, and wherein among plural local modules which have input thereto image information from neighboring regions and which are in charge of different local images, one local module having an activated first sub-module therein outputs a signal for deactivating the first sub-module of another local module in charge of a different local image.

7. An image recognition system for recognizing an object from a global image of the object of recognition input from a camera or other optical pick-up device, and from characteristic local images, comprising:

global image processing means for performing analytical processing on a global image, comprising means for extracting a global characteristic of an input global image and means for evaluating consistency of said extracted global characteristic;

local image processing means for performing analytical processing on a plurality of local images, said local image processing means being made up from a plurality of local modules arranged in correspondence with a topology of a local image, each of said local modules comprising (a) a first sub-module comprising means for extracting a characteristic of an input local image, (b) a second sub-module having stored therein knowledge of an eigenspace of a given local icon of a pre-learned objection of recognition, and (c) a third sub-module comprising means for evaluating consistency based on a projected distance from a result of projecting the image information of said input local image having the characteristic extracted by said first sub-module onto an eigenspace stored in said second sub-module, wherein said global image processing means receives both an input image and inputs from said local modules, and deactivates functions of said local modules which are inconsistent with said global characteristic while activating functions of said local modules which are consistent with said global characteristic, and wherein image information is input to said second sub-module of one of said local modules only when said first sub-modules is activated above a predetermined threshold.

8. An image recognition system according to claim 6, wherein plural local modules in charge of the same local image are arranged in correspondence with a topology of image information formed by the local image.

9. An image recognition system according to claim 7, wherein plural local modules in charge of the same local image are arranged in correspondence with a topology of image information formed by the local image.

10. An image recognition system according to claim 6, wherein when consistency is confirmed based on an evaluation in said third sub-module of one of said local modules, the first sub-module of the same local module is deactivated.

11. An image recognition system according to claim 7, wherein when consistency is confirmed based on an evaluation in said third sub-module of one of said local modules, the first sub-module of the same local module is deactivated.

12. An image recognition system for recognizing an object using a global image processing means and a local image processing means performing parallel processing on a global image of an object of recognition input from a camera or other optical pick-up device and on characteristic local images, comprising:

global image processing means for performing analytical processing on a global image, comprising means for extracting a global characteristic of an input global image and means for evaluating consistency of said extracted global characteristic;

local image processing means for performing analytical processing on a plurality of local images, said local image processing means being made up from a plurality of local modules arranged in correspondence with a topology of a local image, each of said local modules comprising (a) a first sub-module comprising means for extracting a characteristic of an input local image, (b) a second sub-module having stored therein knowledge of an eigenspace of a given local icon of a pre-learned object of recognition, and (c) a third sub-module comprising means for evaluating consistency based on a projected distance from a result of projecting the image information of said input local image having the characteristic extracted by said first sub-module onto an eigenspace stored in said second sub-module, wherein said global image processing means receives an input image and exchanges signals with the sub-modules of said local modules, and deactivates functions of the sub-modules of said local modules which are inconsistent with said global characteristic, while activating functions of the sub-modules of said local modules which are consistent with said global characteristic, thereby effecting a hierarchical control wherein consistency evaluations made in said global image processing means influence activation or deactivation of functions in said sub-modules of said local modules, and wherein respective sub-modules of said local modules of the local image processing means mutually deactivate functions of the sub-modules of other local modules.

13. An image recognition system for recognizing an object using a global image processing means and a local image processing means performing parallel processing on a global image of an object of recognition input from a camera or other optical pick-up device and on characteristic local images, comprising:

global image processing means for performing analytical processing on a global image, comprising means for extracting a global characteristic of an input global image and means for evaluating consistency of said extracted global characteristic;

local image processing means for performing analytical processing on a plurality of local images, said local image processing means being made up from a plurality of local modules arranged in correspondence with a topology of a local image, and wherein plural local modules in charge of the same local image are arranged in correspondence with a topology of image information formed by the local image, each of said local modules comprising (a) a first sub-module comprising means for extracting a characteristic of an input local image, (b) a second sub-module having stored therein knowledge of an eigenspace of a given local icon of a pre-learned object of recognition, and (c) a third sub-module comprising means for evaluating consistency based on a projected distance from a result of projecting the image information of said input local image having the characteristic extracted by said first sub-module onto an eigenspace stored in said second sub-module, wherein said global image processing means receives an input image and exchanges signals with the sub-modules of said local modules, and deactivates functions of the sub-modules of said local modules which are inconsistent with said global characteristic, while activating functions of the sub-modules of said local modules which are consistent with said global characteristic, thereby effecting a hierarchical control wherein consistency evaluations made in said global image processing means influence activation or deactivation of functions in said sub-modules of said local modules, and wherein respective sub-modules of said local modules of the local image processing means mutually deactivate functions of the sub-modules of other local modules.

* * * * *